United States Patent
Gordin et al.

(10) Patent No.: US 10,183,421 B2
(45) Date of Patent: Jan. 22, 2019

(54) MOLDING METHOD

(71) Applicant: General Electric Company, Schenectady, NY (US)

(72) Inventors: Kevin Daniel Gordin, Liberty Township, OH (US); Wendy Wen-Ling Lin, Montgomery, OH (US); Shatil Sinha, Clifton Park, NY (US); Krishnan Balaji Thattai Parthasarathy, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 102 days.

(21) Appl. No.: 15/267,913

(22) Filed: Sep. 16, 2016

(65) Prior Publication Data

US 2018/0079111 A1    Mar. 22, 2018

(51) Int. Cl.
| | |
|---|---|
| *B29C 35/02* | (2006.01) |
| *B29C 35/16* | (2006.01) |
| *B29C 43/36* | (2006.01) |
| *B29C 43/14* | (2006.01) |
| *B29C 70/08* | (2006.01) |

(Continued)

(52) U.S. Cl.
CPC ............. *B29C 35/02* (2013.01); *B29C 35/16* (2013.01); *B29C 43/14* (2013.01); *B29C 43/36* (2013.01);

(Continued)

(58) Field of Classification Search
CPC ......... B29C 35/02; B29C 35/16; B29C 43/36; B29C 45/0003; B29C 45/0005;

(Continued)

(56) References Cited

U.S. PATENT DOCUMENTS

| 4,451,528 A | 5/1984 | Krause |
| 4,937,032 A | 6/1990 | Krone et al. |

(Continued)

FOREIGN PATENT DOCUMENTS

| DE | 10 2014 215964 A1 | 2/2016 |
| FR | 3 015 923 A1 | 7/2015 |

(Continued)

OTHER PUBLICATIONS

International Search Report and Written Opinion issued in connection with corresponding PCT Application No. PCT/US2017/051750 dated Nov. 24, 2017.

*Primary Examiner* — Stella K Yi
(74) *Attorney, Agent, or Firm* — General Electric Company; Brian Overbeck

(57) ABSTRACT

A method of molding a composite structure having continuous fibers contained therein is disclosed. The method including the steps of compressing a first composite material in a mold; forming a cavity in the first composite material; placing a second composite material having continuous fibers contained therein in the cavity formed in the first composite material to minimize movement and distortion of the continuous fibers; compressing the first composite material such that the compression of the first composite material causes the first composite material to flow to edges of the second composite material; and allowing the first composite material to bond to the second composite material under molding temperature and pressure to form the composite structure.

18 Claims, 11 Drawing Sheets

(51) Int. Cl.
*B29C 70/46* (2006.01)
*B29C 70/54* (2006.01)
*B29C 43/18* (2006.01)
*B29K 105/08* (2006.01)
*B29K 105/12* (2006.01)

(52) U.S. Cl.
CPC ............ *B29C 70/081* (2013.01); *B29C 43/18* (2013.01); *B29C 70/46* (2013.01); *B29C 70/545* (2013.01); *B29C 2043/148* (2013.01); *B29C 2043/3665* (2013.01); *B29C 2793/009* (2013.01); *B29C 2793/0054* (2013.01); *B29K 2105/08* (2013.01); *B29K 2105/12* (2013.01)

(58) Field of Classification Search
CPC ... B29C 45/02; B29C 45/13; B29C 2045/135; B29C 45/14344; B29C 2045/14352; B29C 2045/1693; B29C 65/3436; B29C 31/08; B29C 2045/0005; B29C 70/46; B29C 70/02; B29C 70/541
See application file for complete search history.

(56) References Cited

U.S. PATENT DOCUMENTS

| | | | |
|---|---|---|---|
| 6,004,650 | A | 12/1999 | Schweizer et al. |
| 8,734,606 | B2 | 5/2014 | Henkle et al. |
| 9,073,288 | B2 | 1/2015 | Oda et al. |
| 9,096,000 | B2 | 8/2015 | Maliszewski et al. |
| 2004/0145095 | A1* | 7/2004 | McCollum ............ B29C 70/086 264/544 |
| 2007/0243368 | A1 | 10/2007 | Edwards |
| 2013/0136890 | A1 | 5/2013 | Maliszewski et al. |
| 2014/0186166 | A1 | 7/2014 | Kotska |
| 2016/0052203 | A1 | 2/2016 | Fujii et al. |
| 2017/0136714 | A1 | 5/2017 | Eschl et al. |

FOREIGN PATENT DOCUMENTS

| | | |
|---|---|---|
| JP | WO2009142291 | 11/2009 |
| WO | 2015/101741 A1 | 7/2015 |

* cited by examiner

MOLDING METHOD

BACKGROUND OF THE INVENTION

This invention relates generally to molding processes, and more particularly to apparatus and methods for molding workpieces having reinforcing fibers therein.

Molding is a manufacturing process in which molten or otherwise flowable material is introduced into a mold cavity and allowed to solidify or cure forming a completed part.

Molding processes may be used to produce parts from composite materials which comprise reinforcing fibers embedded in a matrix. It is known to employ reinforcing fibers which may be continuous or discontinuous.

For strength purposes it is important that continuous fibers be located and oriented in the actual workpiece as closely as possible to the designers design intent. One problem with existing molding processes is that unpredictable thermal and pressure effects can cause the continuous fibers to be displaced from their intended position and/or orientation.

BRIEF DESCRIPTION OF THE INVENTION

At least one of these problems is addressed by a method of molding in which discontinuous and continuous fibers are introduced in separate molding steps.

According to one aspect of the technology described herein, a method of molding a composite structure having continuous fibers includes the steps of compressing a first composite material in a mold; forming a cavity in the first composite material; placing a second composite material having continuous fibers contained therein in the cavity formed in the first composite material to minimize movement and distortion of the continuous fibers; compressing the first composite material such that the compression of the first composite material causes the first composite material to flow to edges of the second composite material; and allowing the first composite material to bond to the second composite material under molding temperature and pressure to form the composite structure.

According to one aspect of the technology described herein, a method of molding a composite structure having continuous fibers contained therein includes the steps of compressing a first composite material in a mold; forming a cavity in the first composite material; placing a second composite material having continuous fibers contained therein in the cavity formed in the first composite material, wherein the second composite material is in a solid state or at a higher viscosity than that of the first composite material; compressing the first composite material such that the compression of the first composite material causes the first composite material to flow to edges of the second composite material; and allowing the first composite material to bond to the second composite material under molding temperature and pressure to form the composite structure.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
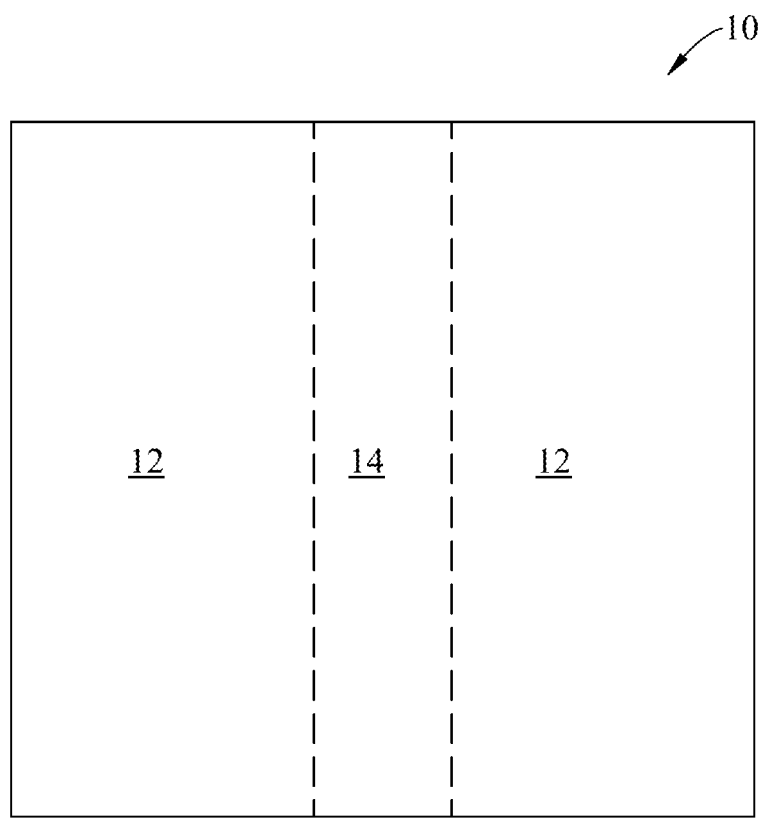
FIG. 1 is a schematic plan view of a composite structure.
Figure 2:
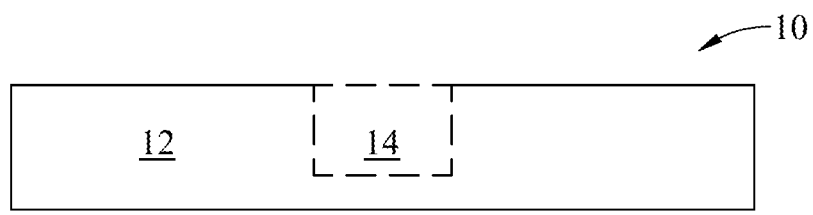
FIG. 2 is an end view of the composite of FIG. 1.

Referring to the drawings wherein identical reference numerals denote the same elements throughout the various views, FIGS. 1 and 2 illustrate schematically a composite structure 10 having a first section 12 and a second section 14 molded together to form the composite structure 10 using a method described below.

Figure 3:
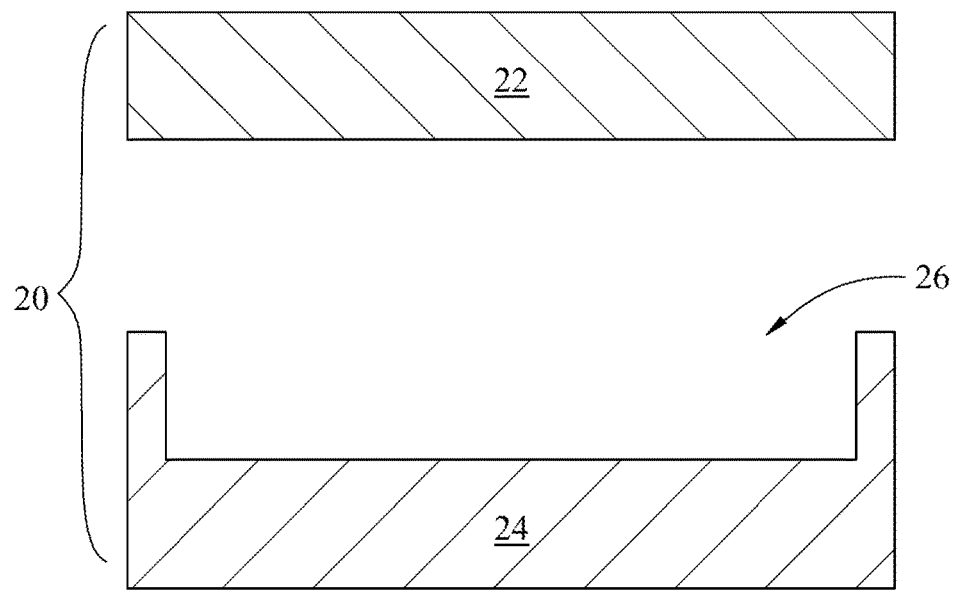
FIG. 3 shows a mold used to form the composite of FIG. 1.
Figure 4:
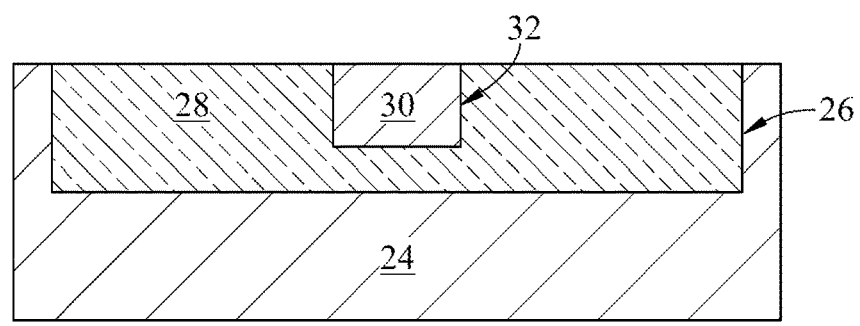
FIG. 4 shows a discontinuous fiber material being positioned in a cavity of the mold of FIG. 3 and a removable tool being positioned in the discontinuous fiber material.

The method uses a mold 20 having an upper section 22 and a lower section 24 configured to press and heat a material therebetween, FIG. 3. As illustrated, the lower section 24 includes a cavity 26, having a predetermined shape, to receive the material to be molded. It should be appreciated that the upper section 22 may also have a predetermined profile to mold an upper portion of the material. One or both of the sections 22 and 24 may be provided with heating means such as an internal electrical resistance heater (not shown). As shown in FIG. 4, a first composite material 28 is placed into the cavity 26 and a removable tool 30 is positioned in the first composite material 28 to form a cavity 32 in the first composite material 28. The tool 30 may be formed of any material which will retain its shape and size under the heat and pressure of the molding process and which will not bond with the first composite material 28. As used herein, the term "composite" refers generally to a material containing a reinforcement such as fibers or particles, for example carbon or ceramic fibers, supported in a binder or matrix material such as a polymer-based resin (for example a thermoplastic resin) or ceramic. In one exemplary embodiment, the first composite material 28 may include discontinuous fibers. As used herein, the term "discontinuous fiber" refers to short fibers which are generally in a chopped or mat configuration. Generally, discontinuous fibers may be about 50.8 mm (2 inches) long or less. An example of a first composite material 28 would include reinforcing fibers about 1.27 cm (0.5 inches) or more in length, in a thermoplastic matrix. The fiber is about 40% or more by volume of the first composite material 28.

Figure 5:
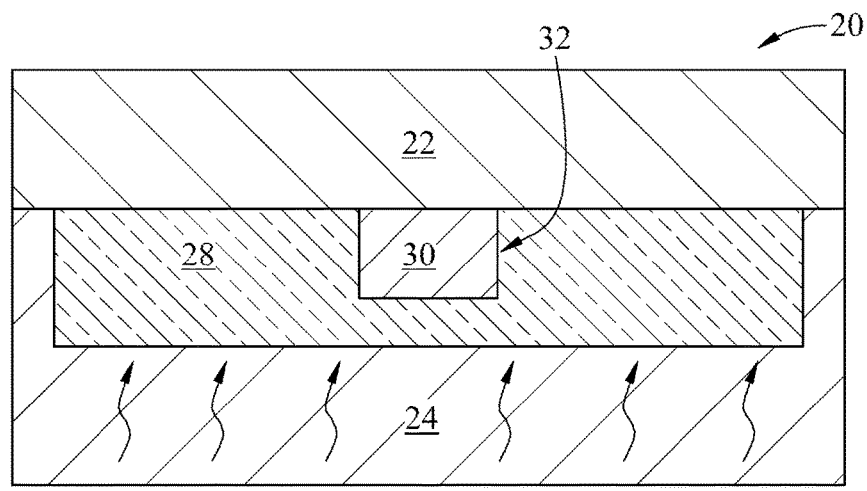
FIG. 5 shows the mold of FIG. 3 pressing and heating the discontinuous fiber material.
Figure 6:
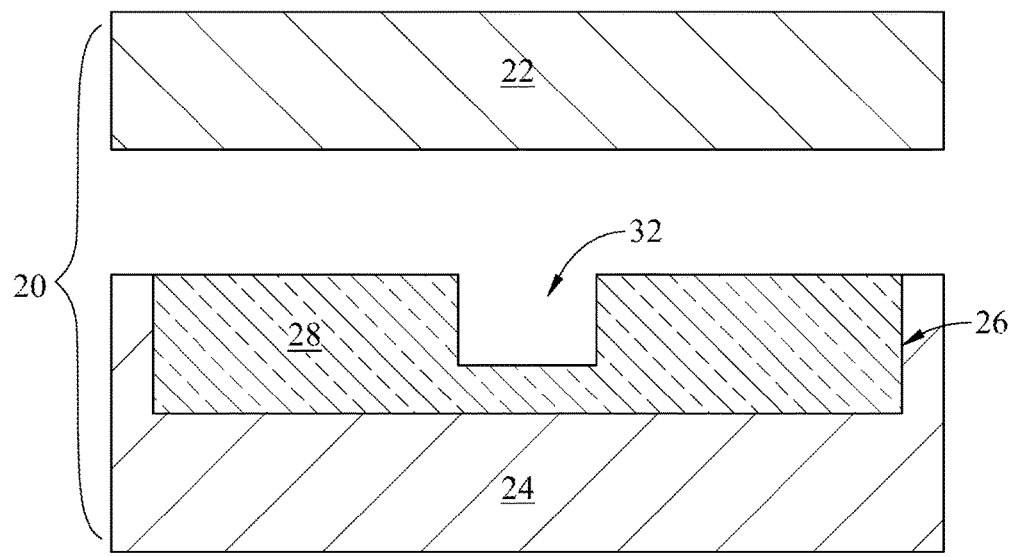
FIG. 6 shows the mold of FIG. 3 being opened to allow the removable tool to be removed from the discontinuous fiber material.
Figure 11:
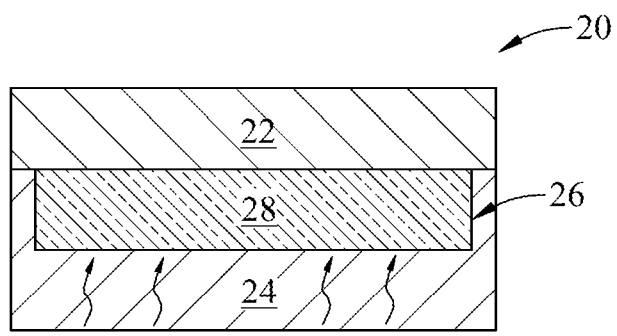
FIG. 11 shows the mold of FIG. 9 pressing and heating the discontinuous fiber material.
Figure 12:
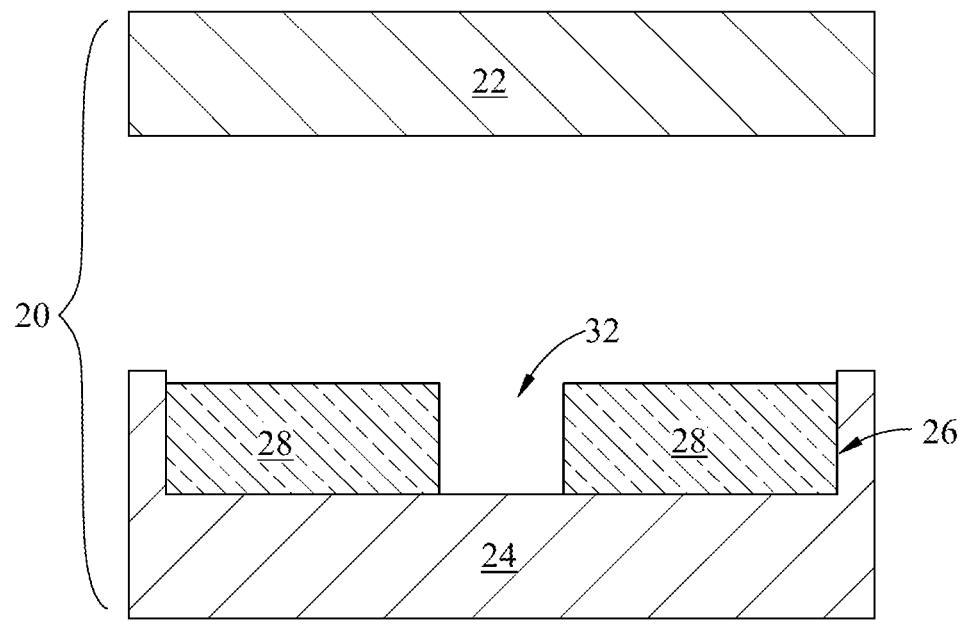
FIG. 12 shows the mold of FIG. 9 being opened to allow a cavity to be formed by removing a portion of the discontinuous fiber material.
Figure 13:
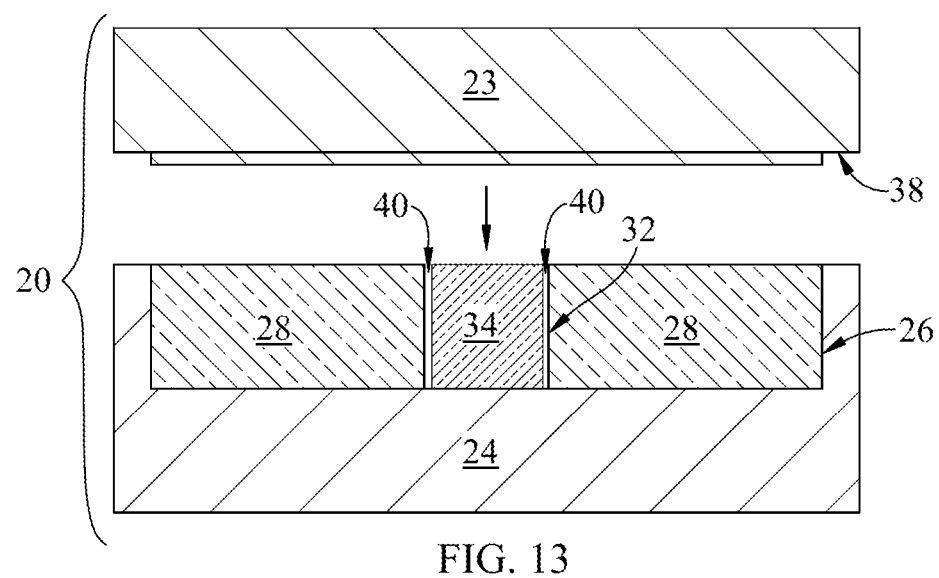
FIG. 13 shows a continuous fiber material being positioned in the cavity.
Figure 14:
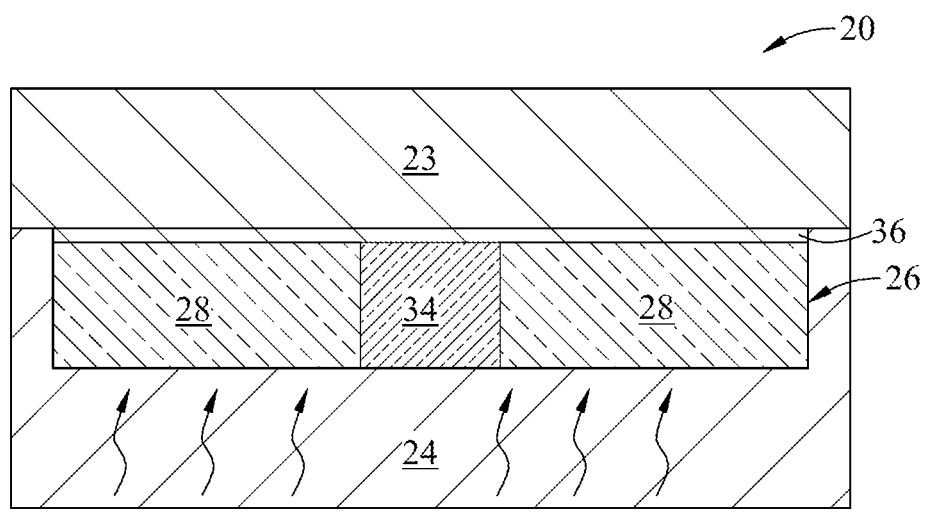
FIG. 14 shows the mold of FIG. 9 pressing and heating the discontinuous fiber material to bond the discontinuous fiber material to the continuous fiber material.
Figure 15:
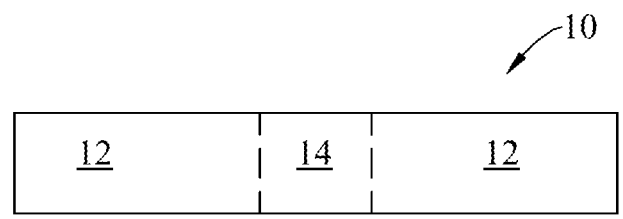
FIG. 15 is an end view of the composite formed by the method of FIGS. 9-14.
Figure 16:
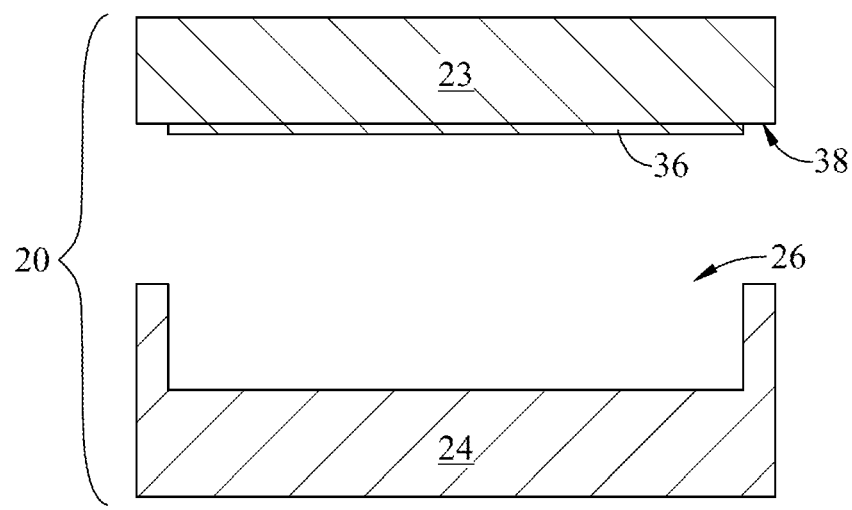
FIG. 16 shows a mold used to form the composite of FIG. 1.
Figure 17:
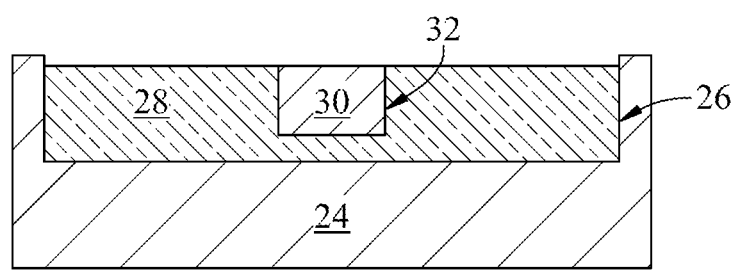
FIG. 17 shows a discontinuous fiber material being positioned in a cavity of the mold of FIG. 16 and a removable tool being positioned in the discontinuous fiber material.
Figure 18:
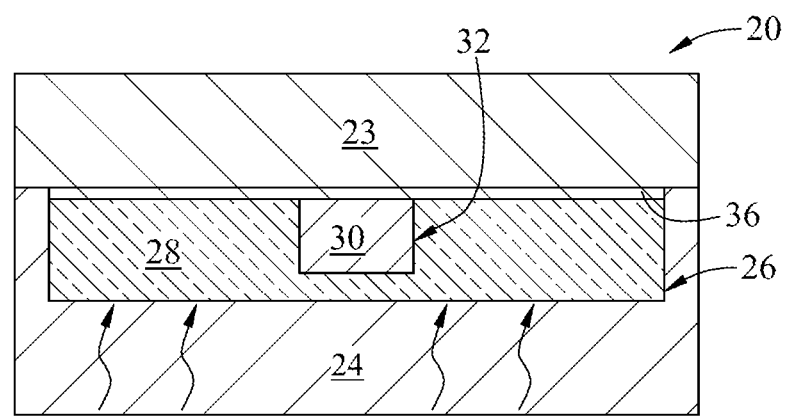
FIG. 18 shows the mold of FIG. 16 pressing and heating the discontinuous fiber material.

The upper and lower sections 22 and 24 of the mold 20 are heated and pressed together to mold the first composite material 28, FIG. 5, to shape with a volume that is substantially equal to, FIGS. 4-6, or greater than, FIGS. 11-12, a final volume of the first section 12 of the composite structure 10. The upper and lower sections 22 and 24 are separated, FIG. 6, and the removable tool 30 removed from the first composite material 28 to expose the cavity 32 formed therein. The cavity 32 is formed to receive a second composite material 34 therein. The second composite material 34 may be the same or different composition as the first composite material 28 so long as it is capable of thermal bonding to the first composite material 28. The second composite material 34 has reinforcing fibers embedded therein, which may be continuous fibers. As used herein, the term "continuous fiber" refers to long fibers having a length greater than about 50.8 mm (2 in.) and which are generally in a unidirectional configuration. It will be understood that the continuous fibers in the second composite material 34 would generally have a diameter similar to those of the discontinuous fibers in the first composite material 28. Accordingly, the overall length of the continuous fibers would generally be much greater than that of the discontinuous fibers. The fiber is about 40% or more by volume of the second composite material 34.

Figure 7:
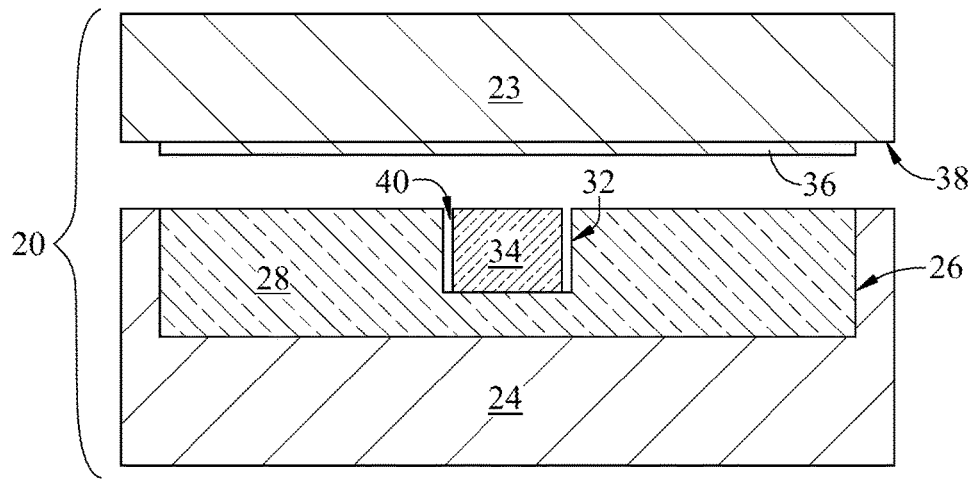
FIG. 7 shows a continuous fiber material being placed in a cavity created by the removable tool.

The second composite material 34 may be placed into the cavity 32, FIG. 7, at a temperature less than that of the first composite material 28 or otherwise in a solid state or at a higher viscosity than that of the first composite material 28, to minimize movement and distortion of continuous fibers contained in the second composite material 34 during final molding and bonding of the composite structure 10. For example, the second composite material 34 may be prepared in a separate process and provided in a room temperature condition.

Figure 8:
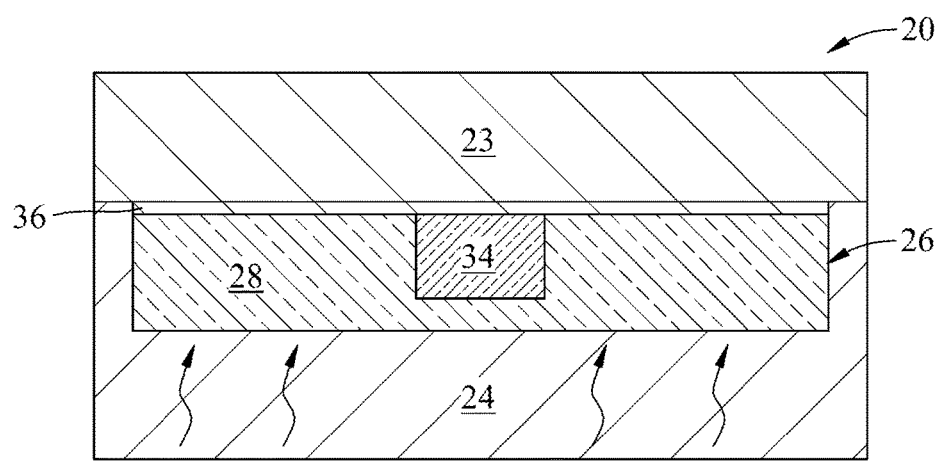
FIG. 8 shows the mold of FIG. 3 pressing and heating the discontinuous fiber material to bond the discontinuous fiber material to the continuous fiber material.
Figure 9:
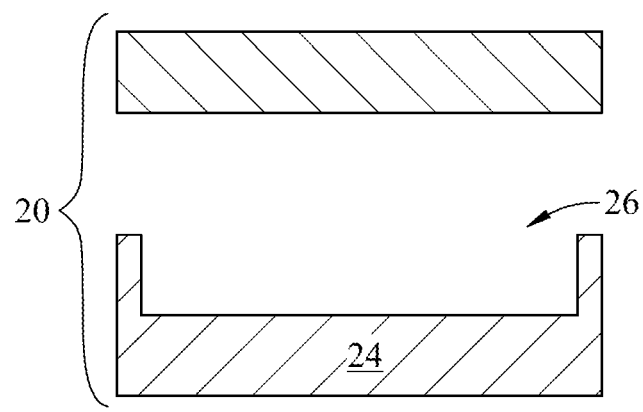
FIG. 9 shows a mold used to form a composite.
Figure 10:
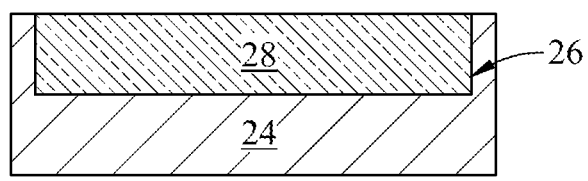
FIG. 10 shows a discontinuous fiber material being positioned in a cavity of the mold of FIG. 9.

As illustrated in FIGS. 7 and 8, the upper section 22 is replaced with upper section 23. Upper section 23 includes a protrusion 36 extending from a bottom 38 of the upper section 23. As shown, the protrusion 36 provides additional compression to the first composite material 28 by extending further into the cavity 26, thereby reducing the volume of the cavity 26 and causing the first composite material 28 to fill in gaps 40 around the second composite material 34. The combination of heating and pressing causes the first composite material 28 to flow to and bond with the second composite material 34 under molding temperature and pressure. In essence, the method creates a boundary condition around the second composite material 34 which will allow for positioning and alignment of the second composite material 34 without compromising the continuous fibers contained therein; thus, preventing damaging shear forces from distorting continuous fibers contained in the second composite material 34 by minimizing movement of the first composite material 28 during the molding process. The method prevents the first composite material 28 from flowing over the second composite material 34 and creates equal pressure around all sides of the second composite material 34 during molding to prevent movement of the second composite material 34 and effectively co-mold the first composite material and second composite material.

After cooling, the resulting composite structure 10 may be removed from the mold 20.

Alternatively, as illustrated in FIGS. 9-15, instead of using removable tool 30, the composite structure 10 may be formed by removing and/or cutting a predetermined amount of the first composite material 28 to form cavity 32. As shown, the first composite material 28 is removed completely from a center of the first composite material 28; however, it should be appreciated that the amount removed and/or cut-out, as well as location of removal, is based on the amount and location of the second composite material 34 desired in the composite structure 10. For example, the amount removed may be as shown in FIG. 12 or as shown in FIG. 6.

The method shown in FIGS. 9-15 is very similar to the method shown in FIGS. 3-8. More particularly, the first composite material 28 is placed into the cavity 26 of the lower section 24 of mold 20, FIG. 10. The upper and lower sections 22 and 24 are heated and pressed together to mold the first composite material 28, FIG. 11. A portion of the first composite material 28 is removed and/or cut out to form cavity 32, FIG. 12. Upper section 22 is replaced with upper section 23 and the second composite material 34 is placed in cavity 32, FIG. 13. The upper section 23 and lower section 24 are heated and pressed together causing protrusion 36 to extend into the cavity 26, thereby reducing the volume of the cavity 26 and causing the first composite material 28 to fill in gaps 40 around the second composite material 34, FIG. 14. The combination of heating and pressing causes the first composite material 28 to flow to and bond with the second composite material 34 to form the composite structure 10, FIG. 15.

Referring to FIGS. 16-21, the method begins with mold 20 having upper section 23 and lower section 24. The first composite material 28 is placed into cavity 26 of the lower section 24 and removable tool 30 is placed in the first composite material 28, FIG. 17. The upper section 23 and lower section 24 are heated and pressed together to mold the first composite material 28 with a volume slightly less than a final volume of the first composite material 28 contained in composite structure 10.

Figure 19:
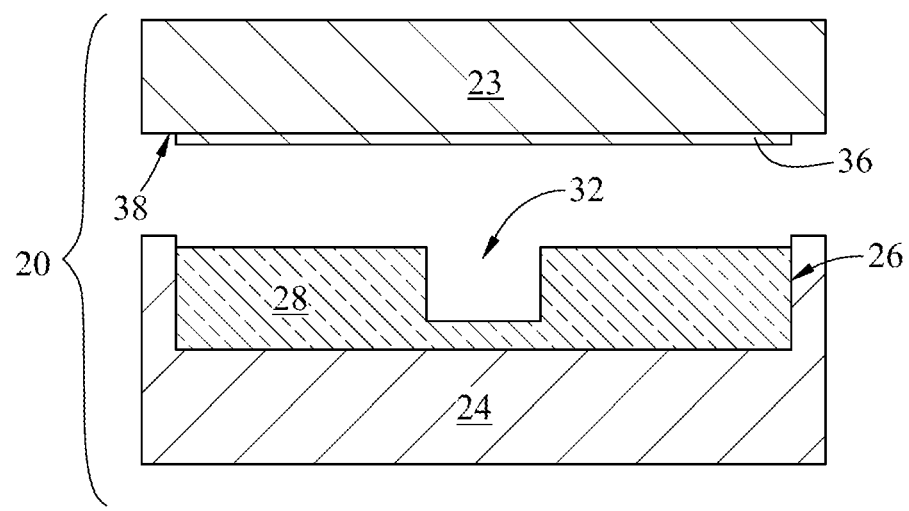
FIG. 19 shows the mold of FIG. 16 being opened to allow the removable tool to be removed from the discontinuous fiber material.
Figure 20:
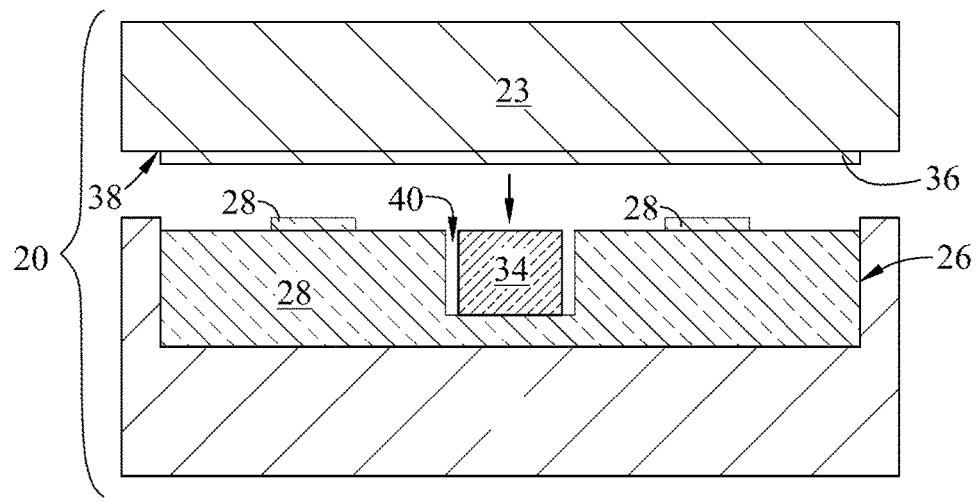
FIG. 20 shows additional discontinuous fiber material being applied to the discontinuous fiber material and continuous fiber material being positioned in a cavity created by the removable tool.
Figure 21:
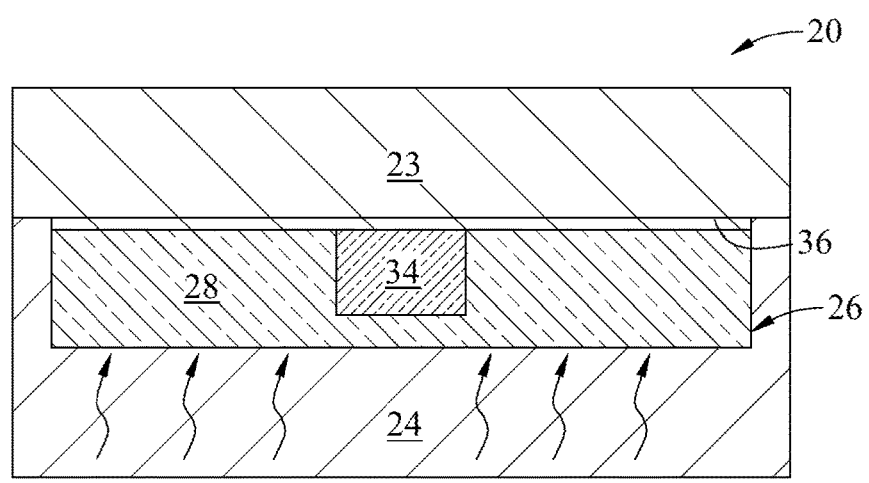
FIG. 21 shows the mold of FIG. 16 pressing and heating the discontinuous fiber material to consolidate the additional discontinuous fiber material with the discontinuous fiber material and to bond the discontinuous fiber material to the continuous fiber material.

The upper and lower sections 23 and 24 are separated and the removable tool 30 is removed from the first composite material 28 to form cavity 32, FIG. 19. The second composite material 34 is placed into cavity 32 and a small amount of additional first composite material 28 is added to slightly increase first composite material 28 volume and allow gaps 40 to be filled, FIG. 20. The upper and lower sections 23 and 24 are heated and pressed together causing the additional first composite material 28 to be incorporated into the original first composite material 28, thereby increasing volume of the first composite material 28 to a volume equal to the final volume and to allow the first composite material 28 to fill in gaps 40 and bond with the second composite material 34 to form composite structure 10.

The process described herein has several advantages over the prior art. In particular, it is able to prevent fiber distortion of continuous fiber material during the molding process. This permits the ability to effectively co-mold continuous and discontinuous fiber reinforced material at low cost.

The foregoing has described a molding process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of molding a composite structure having continuous fibers contained therein, comprising:
   compressing a first composite material in a mold, wherein the first composite material includes discontinuous fibers therein;
   forming a cavity in the first composite material;
   placing a second composite material having continuous fibers contained therein in the cavity formed in the first composite material;
   compressing the first composite material such that the first composite material flows to the edges of the second composite material; and
   allowing the first composite material to bond to the second composite material under molding temperature and pressure to form the composite structure.

2. The method of claim 1, further including the step of allowing the composite structure to cool and solidify prior to placing the second composite material in the cavity.

3. The method of claim 1, further including the step of heating the first composite material to allow the first composite material to flow and bond to the second composite material.

4. The method of claim 1, wherein the step of forming the cavity includes the steps of:
   inserting a removable tool into the first composite material prior to compressing the first composite material in the mold; and
   removing the removable tool from the compressed first composite material.

5. The method of claim 1, wherein the step of forming the cavity includes the step of removing a portion of the first composite material.

6. The method of claim 1, wherein a volume of the first composite material placed in a cavity of the mold prior to compression is equal to a volume of the first composite material contained in the composite structure.

7. The method of claim 1, further including the step of adding additional first composite material to the compressed first composite material to allow the first composite material to flow to the edges of the second composite material and bond thereto.

8. The method of claim 1, wherein the discontinuous fibers have a length of no more than about 2 inches.

9. A method of molding a composite structure having continuous fibers contained therein, comprising:
   compressing a first composite material in a mold, wherein the first composite material includes a matrix material having discontinuous fibers therein;
   forming a cavity in the first composite material;
   placing a second composite material having continuous fibers contained therein in the cavity formed in the first composite material, wherein the second composite material is in a solid state or at a higher viscosity than a viscosity of the first composite material;
   compressing the first composite material such that the first composite material flows to edges of the second composite material; and
   allowing the first composite material to bond to the second composite material under molding temperature and pressure to form the composite structure.

10. The method of claim 9, further including the step of opening the mold to expose the compressed first composite material and allow forming of the cavity.

11. The method of claim 9, further including the step of allowing the composite structure to cool and removing the composite structure from the mold.

12. The method of claim 9, wherein the discontinuous fibers are about 40% or more by volume of the first composite material.

13. The method of claim 9, wherein the second composite material is at a lower temperature than the first composite material when the second composite material is placed in the cavity.

14. The method of claim 13, wherein the continuous fibers are about 40% or more by volume of the second composite material.

15. The method of claim 9, wherein the first composite material includes a polymer-based resin matrix.

16. The method of claim 9, wherein the second composite material includes continuous fibers contained therein.

17. A method of molding a composite structure having continuous fibers contained therein, comprising:
   compressing a first composite material in a mold;
   forming a cavity in the first composite material;
   placing a second composite material having continuous fibers contained therein in the cavity formed in the first composite material;
   compressing the first composite material such that the first composite material flows to the edges of the second composite material; and
   allowing the first composite material to bond to the second composite material under molding temperature and pressure to form the composite structure, wherein a volume of the first composite material placed in a cavity of the mold prior to compression is less than a volume of the first composite material contained in the composite structure.

18. A method of molding a composite structure having continuous fibers contained therein, comprising:
   compressing a first composite material in a mold;
   forming a cavity in the first composite material;
   placing a second composite material having continuous fibers contained therein in the cavity formed in the first composite material, wherein the continuous fibers have a length greater than about 2 inches;

compressing the first composite material such that the first composite material flows to the edges of the second composite material; and allowing the first composite material to bond to the second composite material under molding temperature and pressure to form the composite structure.

\* \* \* \* \*